(12) United States Patent
González-Cruz et al.

(10) Patent No.: US 6,539,738 B2
(45) Date of Patent: Apr. 1, 2003

(54) COMPACT SOLAR-POWERED AIR CONDITIONING SYSTEMS

(75) Inventors: Jorge E. González-Cruz, Cabo Rojo, PR (US); Gerson Beauchamp-Báez, Mayagüez, PR (US)

(73) Assignee: University of Puerto Rico, San Juan, PR (US)

( * ) Notice: Subject to any disclaimer, the term of this patent is extended or adjusted under 35 U.S.C. 154(b) by 0 days.

(21) Appl. No.: 09/877,813

(22) Filed: Jun. 8, 2001

(65) Prior Publication Data

US 2003/0041608 A1 Mar. 6, 2003

Related U.S. Application Data

(60) Provisional application No. 60/210,528, filed on Jun. 8, 2000.

(51) Int. Cl.$^7$ .......................... F25B 27/00; F25B 15/12
(52) U.S. Cl. ...................... 62/235.1; 62/476; 62/484
(58) Field of Search ................ 62/107, 235.1, 62/238.3, 476, 483, 484

(56) References Cited

U.S. PATENT DOCUMENTS

| | | | |
|---|---|---|---|
| 3,491,545 A | * | 1/1970 | Leonard, Jr. |
| 3,552,142 A | * | 1/1971 | Schlichtig ................. 62/485 X |
| 3,605,436 A | * | 9/1971 | Gammill, Jr. ............. 62/476 X |
| 4,027,821 A | | 6/1977 | Hayes et al. |
| 4,143,705 A | | 3/1979 | Awalt, Jr. |
| RE30,027 E | * | 6/1979 | Hockman |
| 4,164,125 A | | 8/1979 | Griffiths |
| 4,205,529 A | * | 6/1980 | Ko ........................ 62/238.3 X |
| 4,222,244 A | | 9/1980 | Meckler |
| 4,251,997 A | * | 2/1981 | Newton ....................... 62/101 |
| 4,257,395 A | | 3/1981 | Wieder |
| 4,269,263 A | | 5/1981 | Yukimachi et al. |
| 4,273,184 A | * | 6/1981 | Tanaka et al. ......... 62/238.3 X |
| 4,300,535 A | * | 11/1981 | Munroe |
| 4,420,947 A | | 12/1983 | Yoshino |
| 4,474,169 A | | 10/1984 | Steutermann |
| 4,507,936 A | * | 4/1985 | Yoshino .................... 62/235.1 |
| 4,513,584 A | | 4/1985 | Woyke |
| 4,577,679 A | | 3/1986 | Hibshman |
| 4,611,654 A | | 9/1986 | Buchsel |
| 4,798,056 A | * | 1/1989 | Franklin .................... 62/235.1 |
| 4,827,735 A | | 5/1989 | Foley |
| 5,943,868 A | * | 8/1999 | Dietz et al. .................. 62/107 |

FOREIGN PATENT DOCUMENTS

| | | | |
|---|---|---|---|
| DE | 19535841 A1 | * | 3/1997 |
| GB | 2063444 A | * | 6/1981 |

OTHER PUBLICATIONS

S.A. Klein, J. A. Duffie, W. A. Beckman—*Transient Considerations of Flat–Plate Solar Collectors*—Journal of Engineering for Power—Apr. 1974—pp. 109–113—Solar Energy Laboratory, The University of Wisconsin, Madison, Wisconsin, USA.

* cited by examiner

*Primary Examiner*—Chen-Wen Jiang
(74) *Attorney, Agent, or Firm*—Patent Law Offices of Heath W. Hoglund (57) ABSTRACT

A design of a compact solar air conditioning system especially suited for tropical climates includes an air-cooled single-effect absorption machine driven by an array of high performance flat-plate collectors along with a thermal storage tank. The absorption machine uses lithium-bromide as a refrigerant and a water-based absorption fluid. The operation of the compact solar air conditioning system is determined by an optimal control strategy.

19 Claims, 8 Drawing Sheets

COMPACT SOLAR-POWERED AIR CONDITIONING SYSTEMS

CLAIM OF PRIORITY

Applicants claim the benefits of priority from U.S. Provisional Application No. 60/210,528 filed Jun. 8, 2000, which is incorporated herein by reference.

GOVERNMENT GRANTS

This research was sponsored by the National Science Foundation under grant no. DMI-9960710.

FIELD OF THE INVENTION

The invention relates generally to air conditioning systems suitable for residential and light commercial applications, and more particularly to solar-powered systems suitable for such applications.

BACKGROUND OF THE INVENTION

The possibility of using solar energy to decrease the usage of electricity in air conditioning systems has been widely suggested. Of all the proposed technologies, solar-assisted air conditioning systems using absorption chillers have become one of the most appealing. Solar absorption cooling systems have been installed in different parts of the world to evaluate their feasibility and performance. These types of systems are described in:

Van Hattem, D., and Dato, P. A., *Description and Performance of an Active Solar Cooling System, Using a LiBr—H2O Absorption Machine*, Energy and Buildings, 1981, Vol. 3, pp. 169–196;

Yellot, J. I., *Operation of an Active Solar Air-Conditioning System in a Hot, Dry Climate*, ASHRAE, 1982, Vol 2;

Bong, T. Y., Ng, K. C., and Tay, A. O., *Performance Study of a Solar-Powered Air Conditioning System*, Solar Energy, 1987, Vol.39, No. 3, pp. 173–182;

Hernández, H., *Analysis and Modeling of a Solar-Assisted Air Conditioning Dehumidification System for Applications in Puerto Rico*, M.S. Thesis, University of Puerto Rico, 1997; and Meza, J. I., Khan, A. Y., and Gonzalez, J. E., *Experimental Assessment of a Solar Assisted Air Conditioning System for Applications in Puerto Rico*, Solar Engineering, 1998, pp. 149–154.

Each of these references is incorporated herein by reference in their entirety.

These and related absorption systems are well known in the art. More generally, absorption is the process by which refrigerant vapor is absorbed to a concentrated solution. The heat of condensation of the water and the heat of mixing are released into the fluid by the absorption process. The fluid must be cooled to allow sufficient refrigerant to be continuously absorbed into solution while maintaining a low-pressure condition. Water and lithium-bromide have been widely used in these systems. This working fluid utilizes water as the refrigerant and is therefore limited to refrigeration temperatures above 0° C. Absorption machines based on water and lithium-bromide are typically configured as water chillers for air-conditioning systems in large buildings. Typical machines are available in sizes ranging from 10 to 1500 tons.

These machines have a reputation for consistent, dependable service. Nonetheless, they also require a large amount of electricity to operate. Although the above-listed solar-powered systems have demonstrated the feasibility of reducing electricity usage, they have not become commercially available or widely used. A number of factors have contributed to this delay. For example, the last listed system uses a cooling tower to exhaust heat generated by the absorption chiller. While such industrial equipment is tolerable in heavy commercial settings, it is unsightly in residential or similar settings.

Likewise, the solar-powered systems have not been available in a package offering a compact design and dependable operation for residential or light-commercial applications.

SUMMARY OF THE INVENTION

According to one aspect of the invention, one preferred solar-powered air conditioning system includes an air-cooled single-effect absorption machine. A lithium-bromide solution is used as the absorbent and a water solution is used as the refrigerant. The absorption machine includes a desorber, condenser, an evaporator and an absorber. The components are selected to deliver a cooling load of three to five tons.

According to another aspect of the invention, a compact solar-powered air conditioning system operates without a cooling tower. The air conditioning system includes solar collectors, a storage tank, and an absorption machine. The solar collectors are positioned to collect energy and to heat water as it passes along a path through their interior. The heated water is passed to the storage tank. The heated water in the storage tank is used to drive the absorption machine, which includes a desorber, a condenser, an evaporator and an air-cooled absorber. The desorber receives the heated water and causes a refrigerant to change from a liquid state to a gaseous state. The condenser then receives the refrigerant in the gaseous state and causes the refrigerant to return to a liquid state. The evaporator then receives the refrigerant in the liquid state and returns the refrigerant to a gaseous state. This change from the liquid state to the gaseous state is able to absorb energy from an external cooling loop. Finally, the absorber then receives the refrigerant in the gaseous state circulates an absorbent solution in the presence of the refrigerant. The absorber releases heat of dilution and heat of condensation. This heat is exhausted by passing ambient air over the absorber.

According to further aspects of the invention, the solar collectors are connected in series and draw water from the storage tank through a manifold. The stratified storage tank draws the heated fluid to drive the refrigeration loop from a layer having a highest temperature. When its temperature is insufficient to drive the refrigeration loop, it is passed through a heater positioned between the storage tank and the absorption machine.

According to still further aspects of the invention, the absorption machine uses a water-based refrigerant and a lithium-bromide absorbent. The components of the absorption machine are housed within an enclosure. The enclosure defines a first air inlet and a first exhaust configured to permit the passage of ambient air through the housing and over the absorber. The enclosure also defines a second air inlet and a second exhaust configured to permit the passage of ambient air through the housing and over the condenser. The absorption machine is configured to deliver a cooling load ranging from three to five tons.

According to another aspect of the invention, a compact solar-powered air conditioning system includes solar collectors, a storage tank and an absorption machine. The solar collectors circulate water to collect energy, the heated water is passed to the storage tank. The absorption machine draws the heated water from the storage tank to drive a cooling circuit. The absorption machine includes an air-cooled condenser, an air cooled absorber and an enclosure. The air-cooled condenser extracts heat by changing the state of a refrigerant from a vapor to a liquid. The air-cooled absorber is coupled with the air-cooled condenser through an evaporator. The air-cooled absorber extracts heat by absorbing a vapor refrigerant in a liquid absorbent. The enclosure houses the air-cooled absorber, and the air-cooled condenser. The enclosure has a first air-flow path configured to pass ambient air across the air-cooled absorber. The enclosure has a second air-flow path configured to pass ambient air across the air-cooled condenser.

According to further aspects of the invention, a first duct through the enclosure defines the first air-flow path that begins with an intake aperture and terminates at an exhaust aperture. A second duct through the enclosure defines the second air-flow path that begins with an intake aperture and terminates at an exhaust aperture. The first and second ducts maintain the first air-flow path separate from the second air-flow path. The enclosure defines at least four distinct surfaces including a top, front, rear and side surface. The side defines the intake aperture and the front defines the exhaust aperture of the first duct. The rear defines the intake aperture and the top defines the exhaust aperture of the second duct. A fan is positioned at or in each duct to drive ambient air through the ducts.

According to a still further aspect of the invention, the air-cooled condenser and the air-cooled absorber are constructed of parallel copper tubes and aluminum fins. Air passes across the aluminum fins to exhaust heat from the components.

According to another aspect of the invention, a solar-powered air conditioning system is operated without a cooling tower. A fluid is drawn from a storage tank at a level having a lower temperature than other levels in the storage tank. The fluid is passed through solar collectors to increase its temperature and returned to the storage tank. The heated fluid is drawn from the storage tank at a level having a higher temperature than other levels of the storage tank. The heated fluid is passed though an air-cooled absorption machine. The energy from the heated fluid drives a cooling loop configured to extract energy from a building.

These and other aspects of the invention will be appreciated in greater detail with reference to the drawings and the detailed description that follows.

DETAILED DESCRIPTION OF THE INVENTION

Details of one preferred compact solar air-conditioned system based on a heat driven absorption cycle are provided. Preferably, the capacity of the system targets a range of 3–5 cooling tons, which is typical of residential and light commercial areas. Preferred control systems and methods are described in related application Ser. No. 09/877,814 titled Automation and Control of Solar Air Conditioning Systems, to Meléndez-González, et al., and filed on Jun. 8, 2001, which is incorporated herein by reference.

Broadly, the system includes a set of flat-plate solar collectors selected to deliver 70–80% of the energy demands of the system. The precise size and number of collectors is determined based upon local conditions. Water from a storage tank is routed through the solar collectors to warm it and thereby increase its energy content. Water is drawn from the storage tank and passed through a boiler or equivalent heater. Depending upon operational conditions, the boiler may be lit or inactive. The warmed water is used to drive an absorption chiller. Various forms of absorption chillers are known by those skilled in the art.

Nonetheless, one preferred absorption chiller system is shown and described with reference to FIG. 1. The primary components of this single-stage system include the absorber 102, the generator or desorber 104, condenser 106 and evaporator 108.

The desorber 104 consists of a set of tubes 110 routed through the interior of a shell 112. Shell 112 contains an intermediate concentration of absorbent and refrigerant solution. Heated water flows through tubes 110 and liberates the refrigerant into a vaporized form. This vapor passes through a connecting pipe to separator 114. The separator 114 includes a set of baffles and eliminators that operate to prevent absorbent from passing to condenser 106. A pipe connects separator 114 to condenser 106 and provides a path for the vapor refrigerant to flow. The desorber 104 is the equivalent of the compressor in conventional compression-based refrigeration cycle systems since it provides the motive force for the process.

The condenser 106 consists of tube bundles defining a refrigerant vapor space. The condenser 106 is positioned near generator 104. A fan 116 cools the tube bundles by blowing ambient air across them. In operation, the low temperature steam vapor in the cooled tube bundles is condensed to a liquid refrigerant. From the condenser 106, the liquid refrigerant passes through an orifice in the bottom of the condenser 106. This orifice leads to evaporator 108, which operates under a vacuum.

The evaporator 108 includes tubes 118 through which chilled water passes. The chilled water is circulated through a cooling loop that operates to satisfy a thermal load. In other words, the chilled water circulates to cool a building or building sub-space. The evaporator 108 operates by dripping or spraying the refrigerant around the tubes. The refrigerant, preferably water, expands in the vacuum. This process causes boiling that absorbs heat from the chilled water tubes 118 within the evaporator 108. The resulting refrigerant vapor is passed to the absorber 102. The absorber also consists of a series of tube bundles over which a strong concentration of absorbent, preferably lithium-bromide, is sprayed or dripped. The absorbent solution absorbs the refrigerant. This releases the heat of dilution and the heat of condensation. This heat is removed by passing ambient air through the tubes. A fan 120 provides this airflow. When the refrigerant vapor is absorbed, a vacuum is created that allows expansion to occur from the evaporator to the absorber.

The dilute absorbent leaves the bottom of absorber 102 through a pipe that connects with heat exchanger 122. From the heat exchanger 122, the dilute absorbent returns to desorber 104. In the opposite direction, concentrate absorbent drained from the separator 114 passes though the heat exchanger 122. This concentrate absorbent is used to spray or drip into absorber 102. The exchange between hot absorbent passing from separator and cold absorbent passing from absorber 102 operates to recycle heat from the generator 104.

Figure 1:
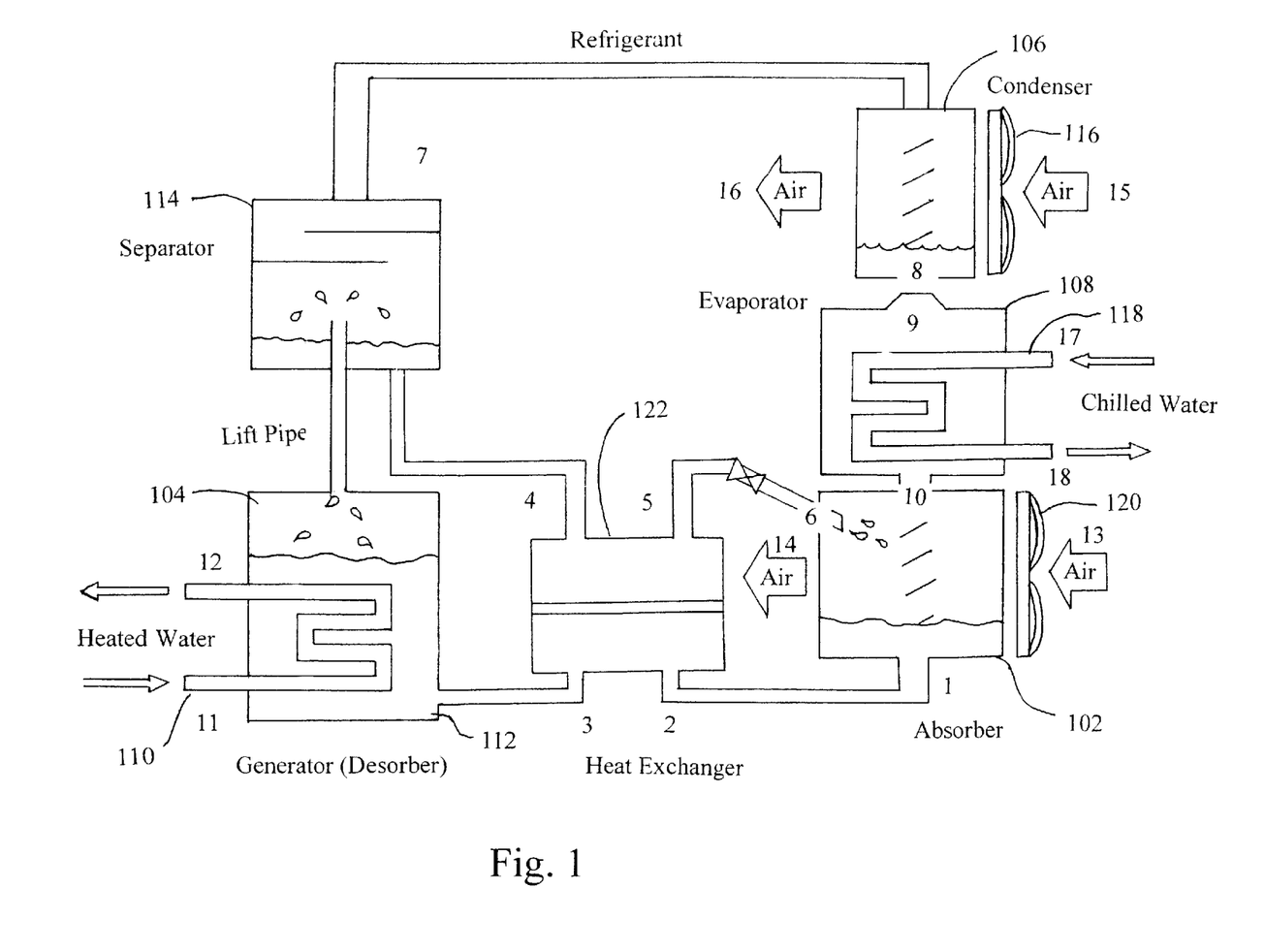
FIG. 1 is a block diagram showing one preferred embodiment of an air-cooled absorption machine.
Figure 2:
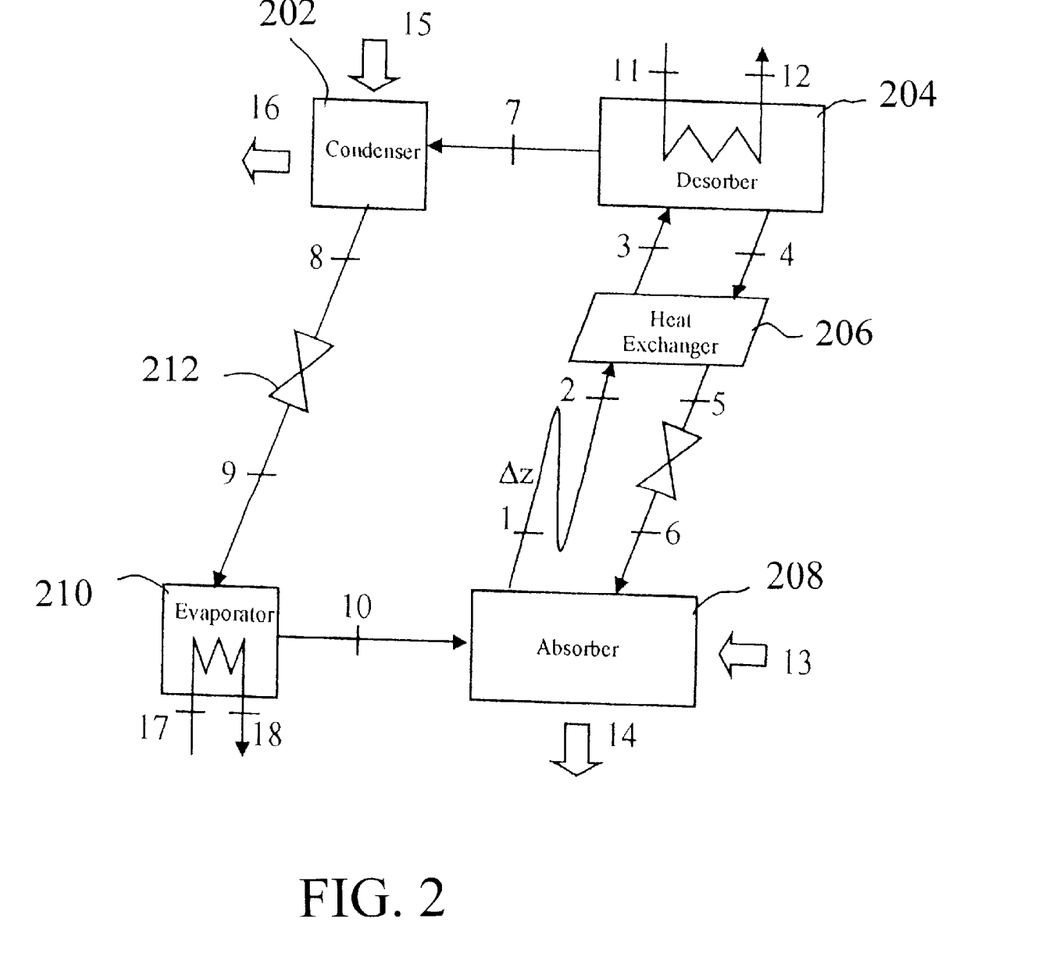
FIG. 2 is a flow chart showing a one preferred operational embodiment of an air-cooled absorption machine.

Turning to FIG. 2, a schematic diagram of the absorption chiller of FIG. 1 is described. The system includes condenser 202, desorber 204, heat exchanger 206, absorber 208 and evaporator 210. Beginning at the exit of desorber 204, the stream consists of absorbent-rich solution, which flows to the absorber through heat exchanger 206. Within absorber 208, the solution absorbs refrigerant vapor from evaporator 210 and rejects heat to the environment. The heat is passed to ambient air flowing across the absorber.

The resulting solution from the absorber 208, which is rich in refrigerant, flows through the heat exchanger 206 to the desorber or generator 204. In the generator 204, thermal energy is added and refrigerant boils off the solution to condenser 202. The refrigerant vapor is condensed and heat is rejected to the environment. The heat is passed to ambient air flowing across the condenser 202. The condensed liquid refrigerant flows through a flow restrictor 212 to evaporator 210. In the evaporator, the heat from the cooling loop evaporates the refrigerant which then flows to absorber 208 and completes the cycle.

This state points along this schematic diagram can be used to model the system for a particular application. Design software, such as the Engineering Equation Solver program, which is commercially available from F-Chart Software (www.fchart.com) can be used to determine parameter ranges. These are used to select and design suitable components preferred embodiments of which are also set forth below.

In one preferred embodiment, the heat exchanger is a plate-type heat exchanger. This type of exchanger offers equal heat transfer for both fluids passing therethrough. In addition, plate heat exchangers offer a compact size. Moreover, these generally offer better efficiency than a shell and tube design. Preferably, the heat exchanger is constructed of Type 316 stainless steel, copper brazed in a vacuum furnace to ensure sealed connections. For a three to five ton cooling load, the heat exchanger is approximately forty cubic inches. Such heat exchangers are commercially available from a variety of manufacturers.

In one preferred embodiment, the evaporator is a shell and tube type construction. In one preferred evaporator the tube is spiral-coiled through the shell. Such evaporators are commercially available from a number of manufacturers. One preferred brand is Heliflow®. It is preferably constructed of mild stainless steel. It has dimensions of approximately 15"×13.25"×12".

The generator is also preferably a shell and tube-type helical-coil exchanger. The absorbent is flooded outside the tubes and the hot water or heat source inside the tubes. Preferably water flow is made through stainless steel tubes and absorbent containment is made by mild steel. These are commercially available from a number of manufacturers. One preferred brand is Heliflow®. It is preferably constructed of mild steel as well. The size of this heat exchanger is approximately 12"×15"×13" for a volume of approximately 1.35 cubic feet.

Figure 3:
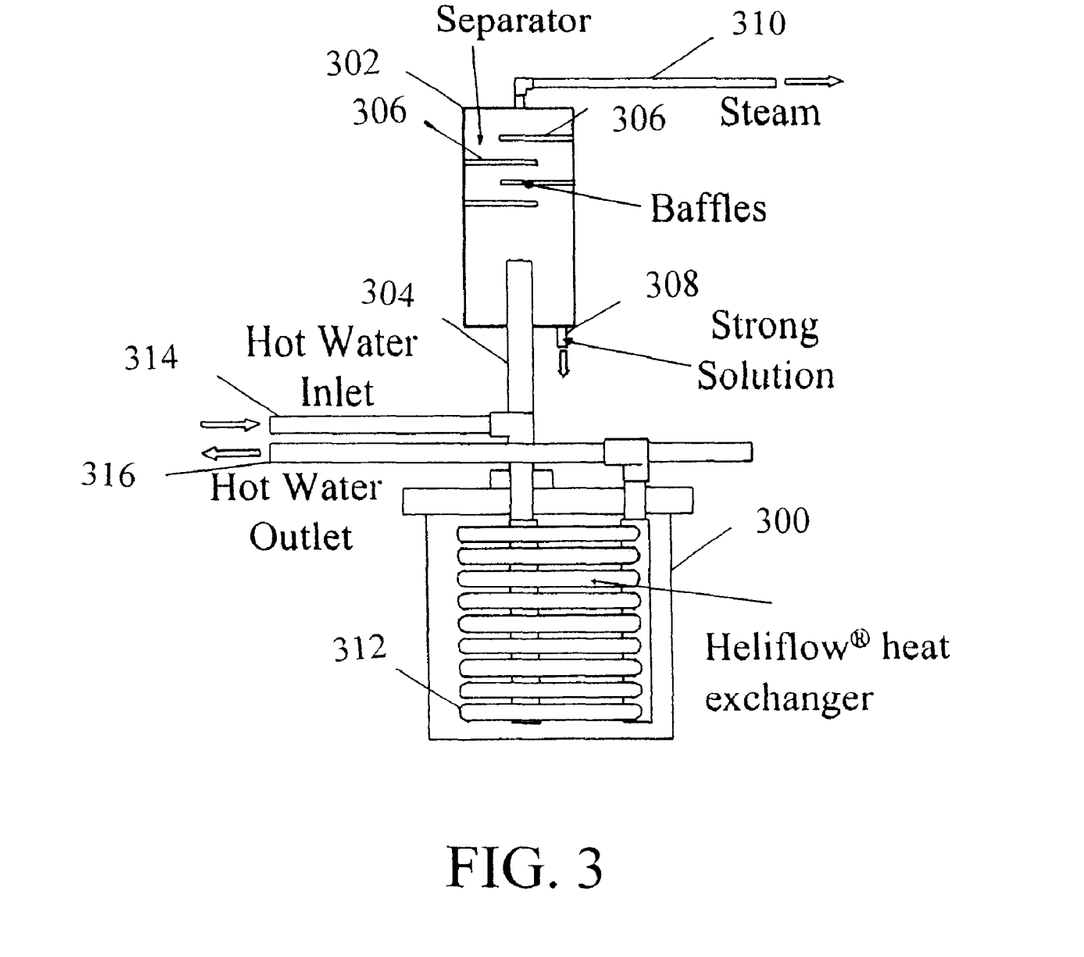
FIG. 3 is a schematic diagram of one preferred embodiment of a desorber and a separator.

The separator is a cylinder having internal baffles. These are also commercially available. A tight connection with the separator and the generator is critical. One preferred separator and generator configuration is shown in FIG. 3. The generator 300 connects directly with separator 302 through a pipe 304. The pipe 304 draws vapor from the top of generator 300 and passes it to separator 302. Baffles 306 restrict the flow and cause the return of absorbent through an outlet 308, while the refrigerant vapor passes through the baffles 308 and out an upper exhaust pipe 310.

The generator receives energy through a helical coil 312. The helical coil 312 receives flow through an inlet pipe 314 and returns through an outlet pipe 316. Preferably, the refrigerant solution covers a substantial portion of the helical coil 312 to maximize heat transfer from the flow.

Figures 4A, 4B:
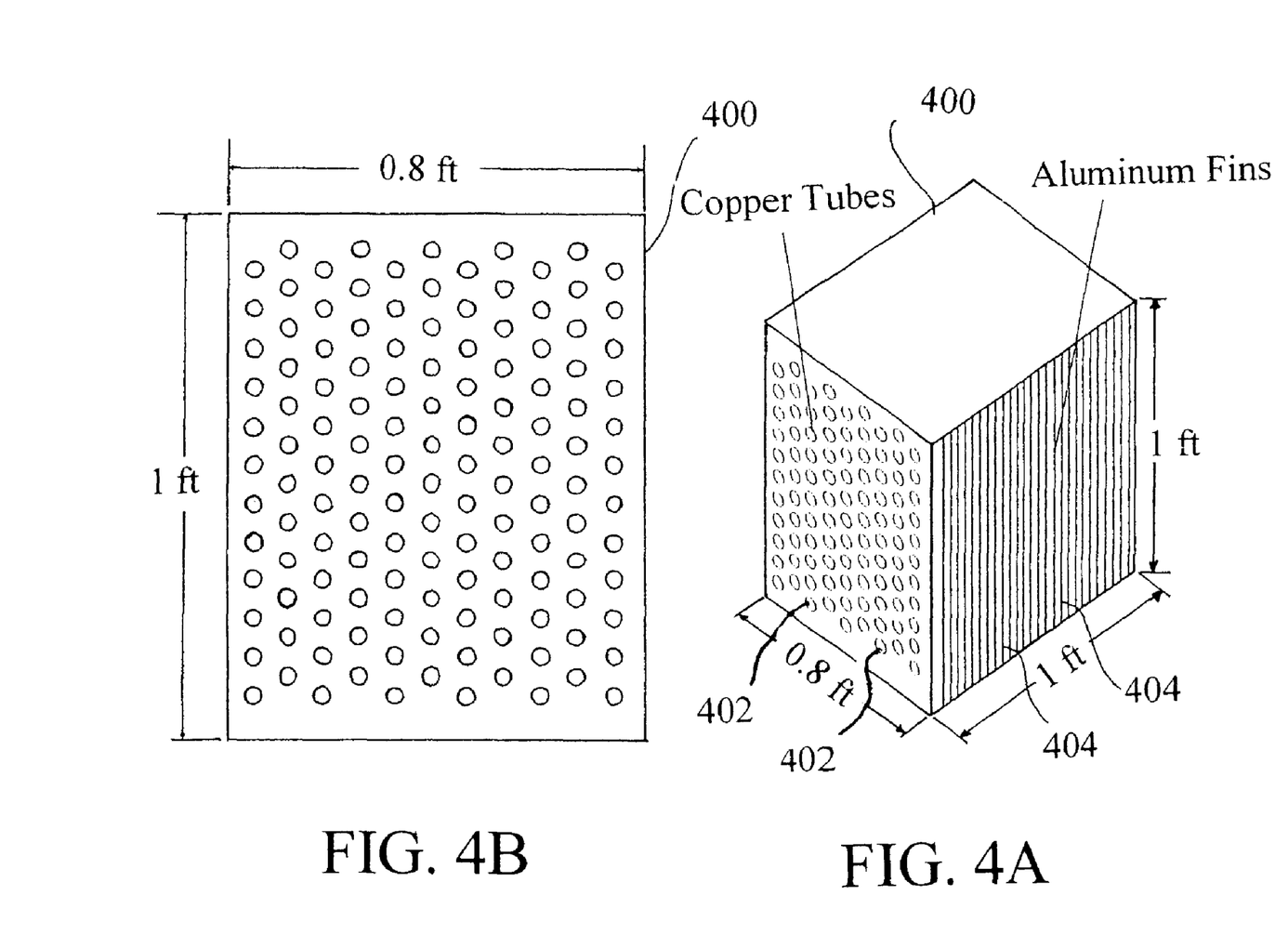
FIG. 4A is a schematic diagram of one preferred condenser shown from a perspective view.
FIG. 4B is a schematic diagram of one preferred condenser shown from a front view.

One preferred condenser is shown in FIGS. 4A and 4B. The condenser 400 receives the vapor flow through copper tubes 402. A fan drives ambient air across the copper tubes 402. This operates to remove heat from the vapor. As a result, the vapor condenses as it passes through the copper tubes 402. In addition, a number of parallel aluminum fins 404 are arranged across the copper tubes 402. The bond between the copper tubes 402 and the aluminum fins 404 operates to pass heat from the copper tubes 402 and to the aluminum fins 404. The fan also drives ambient air across the fins. This operates to improve the heat transfer from the vapor and to condense the refrigerant.

To implement a compact condenser strategy, a modified Shah design method is followed. Details of this design strategy are set forth in Hodge, B. D., Taylor, R. P., *Analysis and Design of Energy Systems*, $3^{rd}$ Ed., Prentice Hall, New Jersey, 1999, which is incorporated herein by reference. Following this design strategy, volume is preferably used as the iterative parameter, while the required condenser rating was the point of convergence. One preferred design is shown in FIGS. 4A and 4B. Note the actual number of tubes is shown for illustrative purposes only. The condenser preferably includes 133 tube surfaces. The final condenser design has an overall size of 1'×1'×0.8' with a total volume of 0.8 cubic feet. Preferably an associated fan provides an air mass flow rate of at least 1 kg/s.

Surface characteristics of the condenser are as follows:

Tube outside diameter=0.402"
Fin pitch=8 per inch
Flow passage hydraulic diameter=0.01192'
Fin thickness=0.013 in
Free-flow area/frontal area=0.534
Heat transfer area/total volume=179 $ft^2/ft^3$
Fin area/total area=0.913

One preferred implementation and associated parameters are listed below in Table 1.

TABLE 1

| Parameter | 3 Ton | 4 Ton | 5 Ton |
|---|---|---|---|
| Qc | 1.1015*10 4 W | 1.4686*10 4 W | 1.8358*10 4 W |
| ε | 75.9% | 76% | 76.1% |

TABLE 1-continued

| Parameter | 3 Ton | 4 Ton | 5 Ton |
|---|---|---|---|
| NTU | 1.421 | 1.425 | 1.431 |
| Water heat transfer coeff. | $1.109*10^3$ BTU/fhr*ft$^2$*R | $1.123*10^3$ BTU/fhr*ft$^2$*R | $1.146*10^3$ BTU/fhr*ft$^2$*R |
| Air heat transfer coeff. | 27.039 BTU/fhr*ft$^2$*R | 27.051 BTU/fhr*ft$^2$*R | 27.051 BTU/fhr*ft$^2$*R |
| N°tubes | 133 | 133 | 133 |
| Volume | .8 ft$^3$ | .8 ft$^3$ | .8 ft$^3$ |
| Air side pressure drop | .043 psi | .045 psi | .045 psi |
| Fan | 1/8 hp | 1/8 hp | 1/8 hp |
| CFM | 2250 | 3000 | 3750 |

Figure 5A:
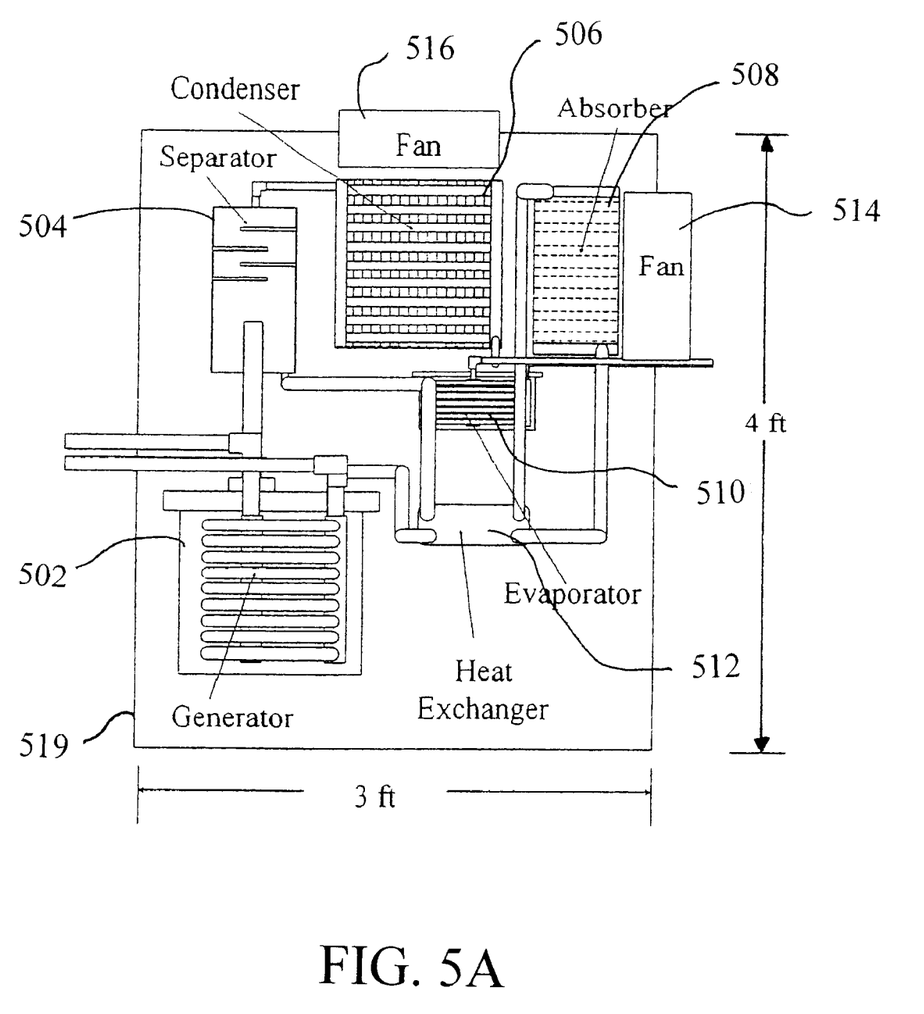
FIG. 5A is a schematic diagram of one preferred absorption machine showing the configuration of the components within an enclosure from a front view.
Figure 5B:
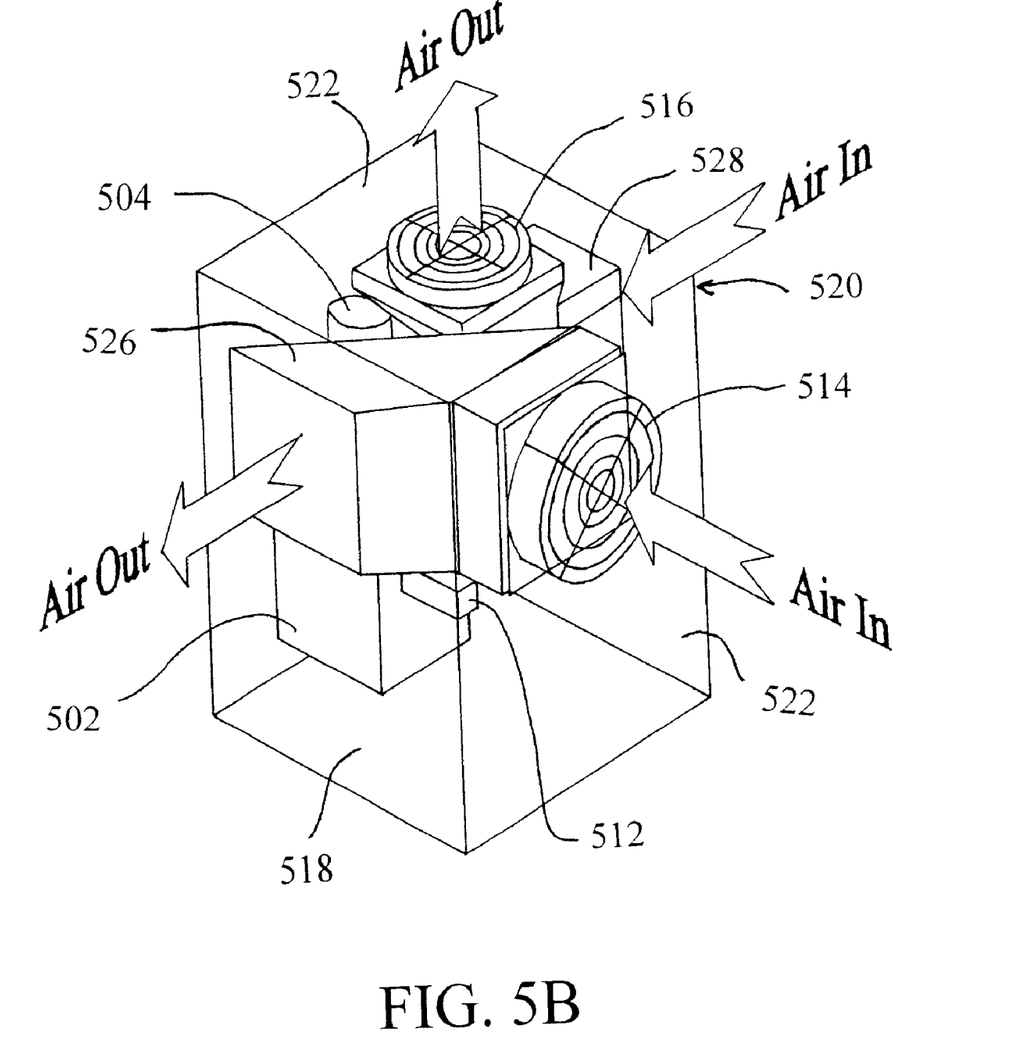
FIG. 5B is a schematic diagram of the absorption machine of FIG. 5A shown from a perspective view.
Figure 6:
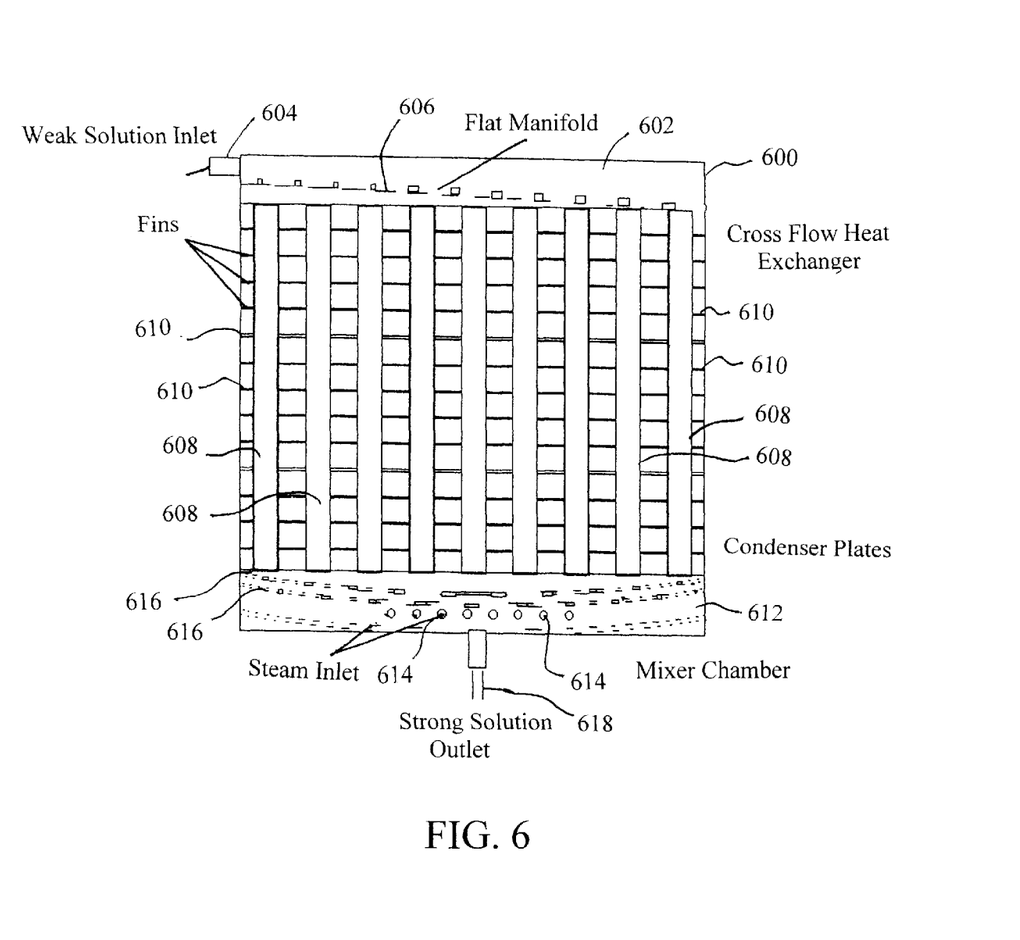
FIG. 6 is a schematic diagram of one preferred absorber.

The condenser is used as part of an air-cooled absorption machine, as shown in FIG. 5. The absorption machine includes components shown in FIG. 1, including an absorber. One preferred absorption machine follows the same design strategy and is shown in FIG. 6. Its parameters are listed below in Table 2.

TABLE 2

| Parameter | 3 Ton | 4 Ton | 5 Ton |
|---|---|---|---|
| Qa[KW] | 14.655 | 19.540 | 24.425 |
| ε | 74.5% | 76.3% | 76.1% |
| NTU | 1.403 | 1.405 | 1.41 |
| Solution heat transfer coeff. | 27.384 BTU/fhr*ft$^2$*R | 27.52 BTU/fhr*ft$^2$*R | 27.58 BTU/fhr*ft$^2$*R |
| Air heat transfer coeff. | 8.038 BTU/fhr*ft$^2$*R | 8.038 BTU/fhr*ft$^2$*R | 8.038 BTU/fhr*ft$^2$*R |
| N°tubes | 532 | 532 | 532 |
| Volume | 10.24 ft$^3$ | 10.24 ft$^3$ | 10.24 ft$^3$ |
| Air side pressure drop | .0013 psi | .0014 psi | .0145 psi |
| Fan | 1/8 hp | 1/8 hp | 1/4 hp |
| CFM | 2250 | 3000 | 3750 |

With reference to FIG. 6, the absorber 600 includes an upper chamber 602. Concentrate absorbent is received through an inlet 604 and into the upper chamber 602. A flat manifold 606 defines a number of passages from the upper chamber 602 that operate to distribute the incoming absorbent across the absorber. As the absorbent passes through manifold 606 is fed to the interior of a plurality of copper pipes 608. As the absorbent passes through the copper pipes 608, ambient air is forced across their exterior surface. This acts to draw heat from the absorbent. In addition, number of aluminum fins 610 are arranged across the copper pipes 608. The ambient air also flows across these aluminum fins 610. The aluminum fins 610 operate to conduct heat from the copper tubes 608 and increase the rate of heat exchange from the absorbent to the ambient air.

After passing through the cooling tubes 608, the absorbent reaches a mixing chamber 612. The mixing chamber also receives steam through inlets 614. The steam is mixed with the absorbent as it drips from the copper tubes 608. Manifolds 616 are configured to distribute the incoming steam with the absorbent. The refrigerant condenses due to the cool temperature of the absorbent. The refrigerant also mixes with the absorbent. This change of state and dilution releases heat energy. A bottom outlet 618 drains the resulting fluid mixture of absorbent and refrigerant out of the absorber.

Preferably, a corrosion inhibitor is used to reduce the brine's attack on the internal metals. Lithium chromate is an excellent inhibitor for protecting steel and ferrous metals in highly corrosive environments. However, chromates are pollutants and known carcinogens, therefore must be controlled. Lithium molybdate can also be used to moderate some of the environmental and health concerns associated with chromates. Like chromates, molybdates are effective reducing lithium bromide corrosion but not as effective. Nonetheless, to minimize environmental impact, this compound is preferred and the materials are selected based on the use of this inhibitor.

Turning to FIG. 5A, one preferred system layout is described. It includes a generator 502, a separator 504, a condenser 506, an absorber 508, an evaporator 510 and a heat exchanger 512. The components are shown from a front view. The components are connected by internal piping as shown and described with reference to FIG. 1 above. Preferably, the components are arranged to fit within a compact rectangular enclosure 519.

In addition, fan 516 is positioned adjacent condenser 506 to draw ambient air across its surfaces. Likewise fan 514 is positioned adjacent absorber 508 to force ambient air across its surfaces.

Turning to FIG. 5B, one preferred enclosure for the absorption chiller is described. It is constructed as a rectangular box that includes a front 518, rear 520, top 522 and side 524. Internally, a duct 526 routes ambient air from an intake proximate fan 514, internally across absorber 508 and out through an exhaust in front 518. Internally, another duct 528 routes ambient air from an intake in rear 520 across condenser 506, through fan 516 and out an exhaust in top 522.

Figure 7:
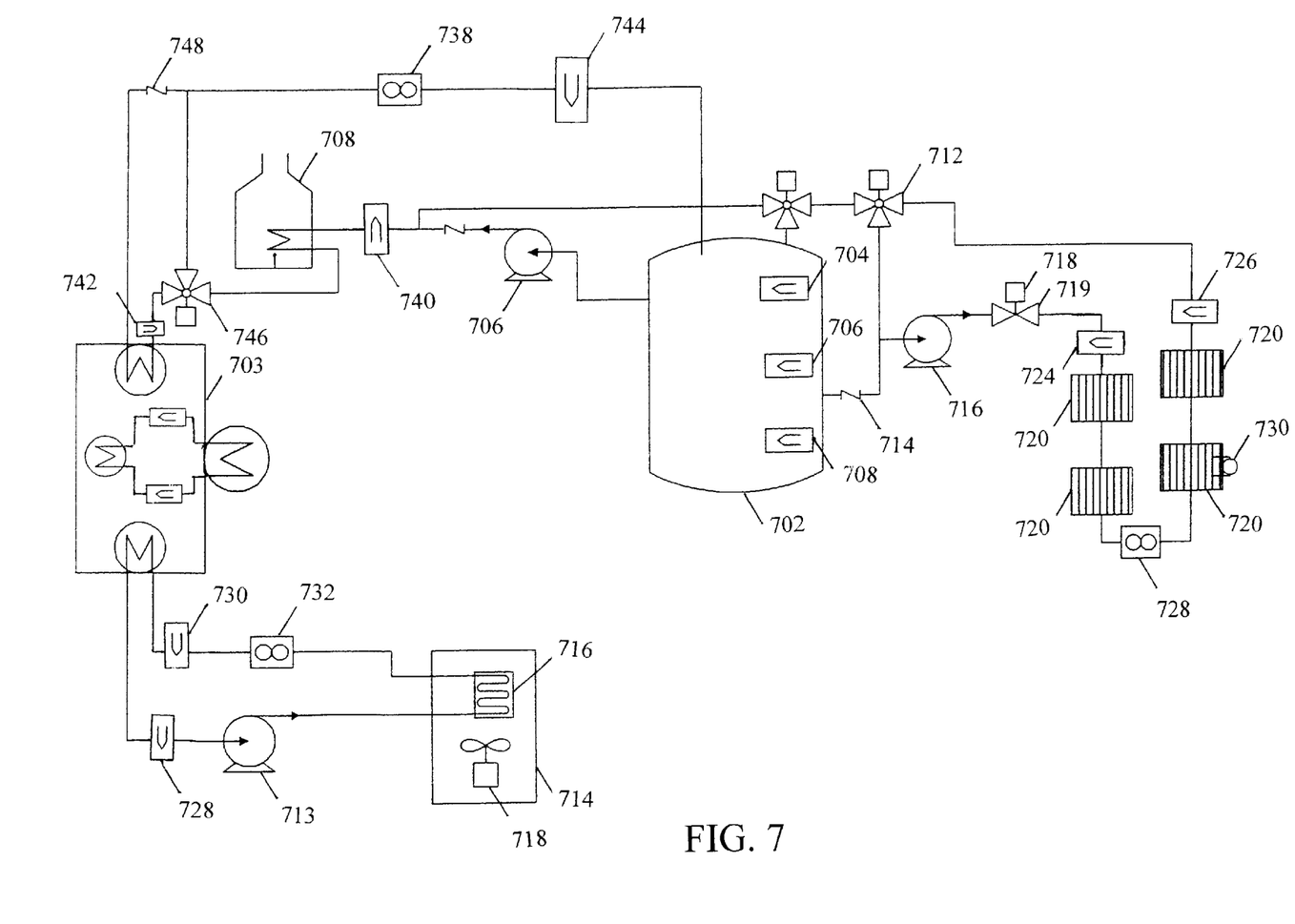
FIG. 7 is a block diagram showing one preferred solar powered air conditioning system using an air-cooled absorption machine.

Turning to FIG. 7, the operation of an air-cooled absorption machine as part of a solar powered air conditioning system is described. The solar collectors 720 are the main power supply for the air conditioning system. The solar collectors 720 should be selected so that approximately 70 to 80% of the energy used by the air conditioning system will come from the solar collector energy. The remaining 20 to 30% will come from electricity or a gas-fired boiler. The thermal storage tank 702 is required to provide the necessary backup energy in the case of unfavorable weather conditions and to extend the hours of operation of the air conditioning system. The storage tank 702 is equipped with flexible stratification manifolds that are capable of distributing the incoming water in the corresponding stratification layer according to its temperature. Likewise, the flexible stratification manifolds allow the outgoing water to be drawn from the stratification layer according to its temperature. Stratification in the storage tank 702 improves the performance of both the absorption chiller and the solar collectors 720 since the air-cooled absorption chiller improves its performance with higher input temperature while the collector's efficiency is higher at lower input temperatures. The water is drawn and returned to the stratification layer that maximizes the performance of the solar collectors 720 and the absorption chiller.

The solar collector loop includes eight sensors and three actuators that are used to control the system. The three actuators of the solar collector loop include a fixed fluid pump 716, a proportional valve 719, and an on-off three-way valve 712. The fixed fluid pump 716 provides the fluid loop from the storage tank 702 into the array of solar collectors 720. The proportional valve 719 regulates the flow rate of the fluid. The on-off three-way valve 712 determines whether the solar collectors 720 are recirculating the fluid in a sub-loop or in a closed loop with the storage tank 702. The sub-loop excludes circulation through storage tank 702. In one mode of operation, water is circulated though this sub-loop until it contains sufficient energy to contribute heat to the storage tank.

The solar collector loop also includes a check valve 714. In operation, this ensures that fluid does not flow into the draw of the storage tank 702 when operating in the sub-loop mode.

The sensors include five thermocouples 704 706, 708, 724 and 726. Thermocouples 704, 706 and 708 are used to monitor the temperature stratification of storage tank 702. Thermocouples 724 and 726 are used to monitor the input and output temperatures of the solar collector array, respectively. The other three sensors are a pyrometer 730 to monitor the incoming solar radiation, a flow meter 728 to monitor the mass flow rate through the solar collectors 720, and a potentiometer 718 that provides the feedback signal from the proportional flow valve 719.

The absorption chiller 703 uses the heat loop as its input and the chilled water loop as its output. The heat loop is responsible for providing the heat energy used to power the absorption cycle and separate the refrigerant from the salt solution. The cooling tower loop is used for two purposes. First, it will condense the refrigerant prior to the evaporator, in which the cooling effect is produced. Second, it will all for the resulting solution out of the evaporator to recombine with the salt solution. Heat generated by these processes are exhausted to ambient air.

As functional elements, the heat loop draws water or other suitable fluid from a storage tank 702 by a pump 706. The water circulates through a boiler 708 that operates to increase its energy content when necessary under current operational conditions. After passing though the boiler 708, the water is passed to the absorption chiller 703 as the energy source for its cooling cycle. The water is then returned to storage tank 702.

The chilled water loop also includes a pump 713 that draws from the absorption chiller 703 and circulates through an air handling unit 714. The air handling unit 714 is responsible for drawing heat energy and humidity out of the air within a building. This exchange is performed by passing the cooled liquid through a radiator 716. A fan 718 blows ambient room air through the radiator to affect the heat transfer. The cooled liquid is, as a result, warmed and returned to the absorption chiller 703 for another cycle.

Together, these two loops include a number of sensors and actuators. The chilled water loop has two thermocouples 728 and 730 to monitor the inlet and outlet temperatures, respectively. It also includes a proportional flow control valve 734. The flow control valve 734, the water pump 713 and the fan 718 are the actuators for this loop. The chilled water loop further includes a flow meter 732 to measure the mass flow rate. As well as a potentiometer 736 to provide a feedback signal from the proportional flow control valve (not shown).

The heat loop has a flow meter 738 and three temperature sensors 740, 742 and 744. The additional temperature sensors in this loop are required due to the gas-fired boiler 708. The first temperature sensor 740 monitors the inlet to the boiler. The second temperature sensor 742 measures the boiler's outlet as well as the inlet to the absorption chiller 703 from the heat loop. The third temperature sensor 744 measures the heat loop outlet temperature. The actuators in the heat loop are the water pump 706, the boiler 708 and an on-off three-way valve 746.

The inlet water to the heat loop can be delivered from two different sources. The first source, which will be used during the majority of its operation, comes from the thermal storage tank 702. When the tank is the source for the loop, the pump 706 that is located in this loop drives the water from the storage tank 704 to the absorption chiller 703 and back to the storage tank 702. The other source is the solar collector array using the pump in the solar collector loop. In this configuration, a three-way diverting valve bypasses the water coming from the collector into the tank directly to the absorption chiller 703. The outlet from the absorption chiller then goes back to the storage tank 704.

The heat loop also includes a three-way valve 746 that is used to bypass the absorption chiller 703. At start up, this bypass loop may be used to raise the temperature of the water before circulating it through the absorption chiller 703. A check valve 748 prevents back flow from the bypass loop into the return from the absorption chiller 746.

Although the invention has been described with reference to preferred embodiments, those skilled in the art will appreciate that many modifications and variations are possible without departing from the scope of the invention. All such modifications and variations are intended to be encompassed within the scope of the following claims.

We claim:

1. A compact solar-powered air conditioning system operable without the use of a cooling tower comprising:
    a plurality of solar collectors positioned to collect energy and configured to heat a fluid along a path that passes through the solar collectors;
    a storage tank coupled with the solar collectors and configured to store the heated fluid after passing through the solar collectors; and
    an absorption machine operationally coupled with the storage tank and configured to draw the heated fluid from the storage tank to drive a refrigeration loop, wherein the absorption machine includes:
        a desorber that receives the heated fluid and causes a refrigerant to change from a liquid state to a gaseous state using energy from the heated fluid;
        a condenser in communication with the desorber to receive the refrigerant in the gaseous state therefrom and configured to cause the refrigerant to return to a liquid state;
        an evaporator in communication with the condenser to receive the refrigerant in the liquid state therefrom and to return the refrigerant to a gaseous state, wherein the change from the liquid state to the gaseous state is able to absorb energy from an external cooling loop;
        an absorber in communication with the evaporator to receive the refrigerant in the gaseous state therefrom and configured to circulate an absorbent solution in the presence of the refrigerant, whereby the absorber releases heat of dilution and heat of condensation, and wherein the heat of dilution and the heat of condensation are exhausted by passing ambient air over the absorber, and
        a housing that encloses the desorber, the condenser, the evaporator and the absorber, and wherein the housing defines a first air inlet and a first exhaust configured to permit the passage of ambient air through the housing and over the absorber.

2. The compact solar-powered air conditioning system of claim 1, wherein the plurality of solar collectors are connected in series and wherein the fluid that passes through the solar collectors comprises water.

3. The compact solar-powered air conditioning system of claim 1, wherein the storage tank comprises a stratified storage tank operable to draw the heated fluid to drive the refrigeration loop from a layer having a highest temperature.

4. The compact solar-powered air conditioning system of claim 1, further comprising a heater operationally positioned between the storage tank and the absorption machine and operable to further heat the heated fluid drawn from the storage tank when its temperature is insufficient to drive the refrigeration loop.

5. The compact solar-powered air conditioning system of claim 1, wherein the refrigerant comprises water.

6. The compact solar-powered air conditioning system of claim 1, wherein the absorbent comprises lithium-bromide.

7. The compact solar powered air conditioning system of claim 1, wherein the housing further comprises a second air inlet and a second exhaust configured to permit the passage of ambient air through the housing and over the condenser.

8. The compact solar powered air conditioning system of claim 1, wherein the absorption machine is configured to deliver a cooling load ranging from three to five tons.

9. A compact solar-powered air conditioning system operable without the use of a cooling tower comprising:
   a plurality of solar collectors positioned to collect energy and configured to heat a fluid along a path that passes through the solar collectors;
   a storage tank coupled with the solar collectors and configured to store the heated fluid after passing through the solar collectors;
   a heater operationally positioned between the storage tank and the absorption machine and operable to further heat the heated fluid drawn from the storage tank when its temperature is insufficient to drive the refrigeration loop;
   an absorption machine operationally coupled with the storage tank and configured to draw the heated fluid from the storage tank to drive a refrigeration loop, wherein the absorption machine includes:
   a desorber that receives the heated fluid and causes a refrigerant to change from a liquid state to a gaseous state using energy from the heated fluid;
      a condenser in communication with the desorber to receive the refrigerant in the gaseous state therefrom and configured to cause the refrigerant to return to a liquid state;
      an evaporator in communication with the condenser to receive the refrigerant in the liquid state therefrom and to return the refrigerant to a gaseous state, wherein the change from the liquid state to the gaseous state is able to absorb energy from an external cooling loop; and
      an absorber in communication with the evaporator to receive the refrigerant in the gaseous state therefrom and configured to circulate an absorbent solution in the presence of the refrigerant, whereby the absorber releases heat of dilution and heat of condensation, and wherein the heat of dilution and the heat of condensation are exhausted by passing ambient air over the-absorber; and
      a housing that encloses the desorber, the condenser, the evaporator and the absorber, and wherein the housing defines a first air inlet and a first exhaust configured to permit the passage of ambient air through the housing and over the absorber, and a second air inlet and a second exhaust configured to permit the passage of ambient air through the housing and over the condenser; and wherein:
         the absorption machine is configured to deliver a cooling load ranging from three to five tons;
         the plurality of solar collectors are connected in series and the fluid that passes through the solar collectors comprises water;
         the storage tank comprises a stratified storage tank operable to draw the heated fluid from a layer having a highest temperature;
         the refrigerant comprises lithium-bromide; and
         the absorbent comprises water.

10. A compact solar-powered air conditioning system comprising:
   a plurality of solar collectors configured to circulate a fluid to collect energy;
   a storage tank in communication with the plurality of solar collectors and configured to store the fluid after passing through the plurality of solar collectors; and
   an absorption machine in communication with the storage tank and configured to draw the fluid from the storage tank to drive a cooling circuit, wherein the absorption machine includes:
      an air-cooled condenser configured to extract heat by changing the state of a refrigerant from a vapor to a liquid; and
      an air-cooled absorber coupled with the air-cooled condenser through an evaporator and configured to extract heat by absorbing a vapor refrigerant in a liquid absorbent; and
      an enclosure housing the air-cooled absorber, and the air-cooled condenser and having a first air-flow path configured to pass ambient air across the air-cooled absorber and a second air-flow path configured to pass ambient air across the air-cooled condenser.

11. The compact solar-powered air conditioning system of claim 10, wherein the enclosure of the absorption machine further comprises a first duct defining the first air-flow path, and a second duct defining the second air-flow path, and wherein the first and second ducts maintain the first air-flow path separate from the second air-flow path.

12. The compact solar-powered air conditioning system of claim 11, wherein the enclosure of the absorption machine defines a first intake aperture for the first duct and a first exhaust aperture for the first duct, and a second intake aperture for the second duct and a second exhaust aperture for the second duct, and wherein the first intake aperture and the second intake aperture are separate, and the first exhaust aperture and the second exhaust aperture are separate.

13. The compact solar-powered air conditioning system of claim 12, wherein the enclosure defines at least four distinct surfaces including a top, front, rear and side surface, and wherein the side defines the first intake aperture and the front defines the first exhaust aperture, and wherein rear defines the second intake aperture and the top defines the second exhaust aperture.

14. The compact solar-powered air conditioning system of claim 11, wherein the absorption machine further comprises a first and a second fan, wherein the first fan is positioned to move ambient air through the first duct and the second fan is positioned to move ambient air through the second duct.

15. The compact solar powered air conditioning system of claim 10, wherein the storage tank further comprises a stratified storage tank so that the fluid drawn by the absorption machine is drawn from a layer within the storage tank having a temperature higher than other layers within the storage tank.

16. The compact solar-powered air conditioning system of claim 10, wherein the refrigerant comprises water and the absorbent comprises lithium-bromide.

17. The compact solar-powered air conditioning system of claim 10, wherein the air cooled condenser of the absorption machine comprises a plurality of parallel copper tubes that pass the refrigerant and a plurality of parallel aluminum fins each defining a plurality of passages for the copper tubes that pass therethrough so that heat from the refrigerant is conducted out of the copper tubes and through the aluminum fins.

18. A method of operating a solar-powered air conditioning system comprising the steps of:

drawing a fluid from a storage tank at a level having a lower temperature than other levels in the storage tank;

passing the fluid drawn from the storage tank at the level having the lower temperature through a plurality of solar collectors, wherein the fluid experiences an increase in temperature;

returning the fluid to the storage tank;

drawing the fluid from the storage tank at a level having a higher temperature than other levels of the storage tank;

passing the fluid drawn from the storage tank at the level having the higher temperature though an air-cooled absorption machine, wherein energy from the fluid drives a cooling loop configured to extract energy from a building, and passing ambient air through a housing that encloses the absorption machine, wherein the air is drawn through an inlet in the housing, passes over at least a portion of the absorption machine, and is discharged through an outlet in the housing.

19. The method of claim 18, wherein the step of passing the fluid drawn from the storage tank at the level having the higher temperature through the air-cooled absorption machine further comprises:

liberating a water-based refrigerant from a liquid to a vapor state; and absorbing the water-based refrigerant in a lithium-bromide absorbent.

* * * * *